May 26, 1970     F. E. TARALA     3,513,643

FILTER

Filed May 21, 1968

INVENTOR
FREDERICK E. TARALA

BY

ATTORNEY

United States Patent Office 3,513,643
Patented May 26, 1970

---

3,513,643
FILTER
Frederick E. Tarala, Pittsford, N.Y., assignor to Dollinger Corporation, Rochester, N.Y., a corporation of New York
Filed May 21, 1968, Ser. No. 730,850
Int. Cl. B01d 50/00
U.S. Cl. 55—473
2 Claims

ABSTRACT OF THE DISCLOSURE

A corrugated, porous air filter element is secured in a rectangular frame, which surrounds, and is secured to marginal edge portions of the element. The element consists a central fiber glass layer secured between a relatively stiff, thermosetting layer, which resiliently retains the corrugations in place, and a porous charcoal filter paper for removing odors from air passed through the filter. The opposite ends of the corrugations and opposite ends of the filter element itself are coated with an adhesive which secures the element in the frame. The element is inserted in the frame by compressing its corrugations, inserting it while compressed in the opening of the frame parallel to the frame length, rotating the element to engage opposite ends of its corrugations with the longitudinal sides of the frame, and then releasing the element so that it fills the frame opening.

---

This invention relates to filters, and more particularly to an improved corrugated-type air filter.

It has become increasingly commonplace to install air filtration apparatus in homes, hospitals, office buildings, etc., to remove dust, pollen, and other foreign particles from the air or substantially to reduce its content thereof. Appliances are also provided to eliminate objectionable odors. Some of these appliances utilize electrical precipitation for removing foreign particles from the air, while other systems rely solely upon standard porous filters for mechanically filtering out the particles. The disadvantage of the electrical systems is that they are usually quite expensive to manufacture and maintain. The mechanical systems, on the other hand, while being less expensive, heretofore have not been efficient in removing the dust, pollen, and other air-borne matter, which can make life so miserable for people who suffer from allergies, asthma, and other nasal disorders, and they are of little value as odor-removers.

It is an object of this invention, therefore, to provide an improved air filter, which combines the better qualities of both electrostatic and mechanical type air filters.

Another object of this invention is to provide an improved filter, which will remove odors as well as dust particles, and the like, from air.

A further object of this invention is to provide an improved filter of the type described having a corrugated, porous filter element, which can readily be assembled in a preformed housing.

Other objects of the invention will be apparent hereinafter from the specification and from the recital of the appended claims, particularly when read in conjunction with the accompanying drawing.

Figure 1:
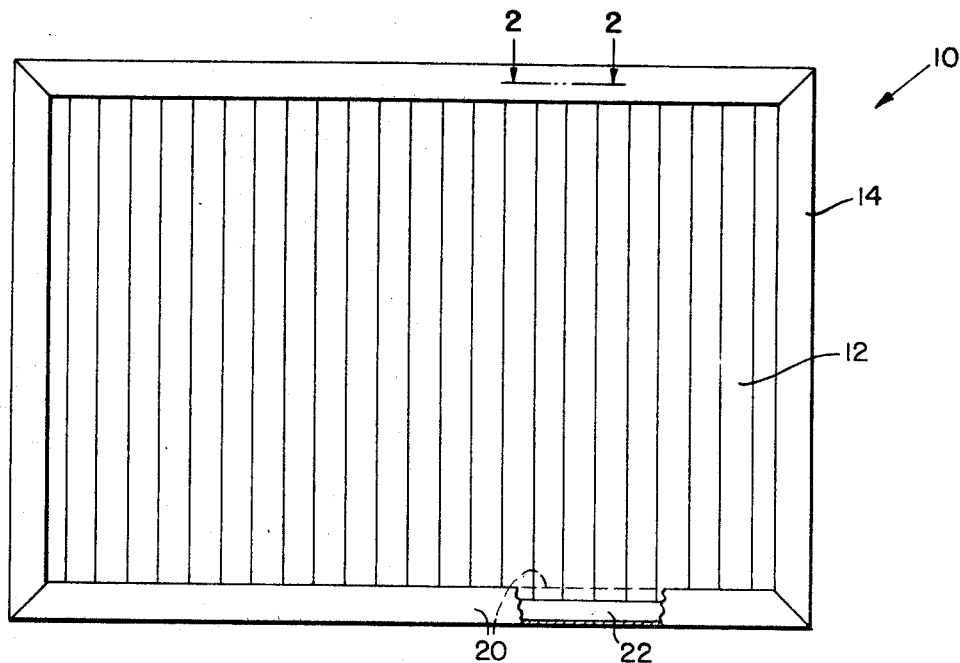
FIG. 1 is a front elevational view of a filter made in accordance with one embodiment of this invention, a portion of the filter frame being broken away and shown in section.

Referring now to the drawing by numerals of reference, 10 denotes a filter comprising a porous, corrugated filter element 12, which is secured in a rectangular frame 14. Element 12 comprises a sheet 16 of conventional filter paper, a relatively thick, intermediate layer 17 of fiber glass, and a sheet 18 of charcoal paper. The fiber glass layer is sandwiched between the two paper layers and forms a relatively high efficiency filter medium. Sheet 16 is a conventional sheet of porous thermosetting filter paper, which is sufficiently rigid so that it functions primarily to hold element 12 in its corrugated shape. Layer 18 is a porous filter sheet saturated with an activated carbon for removing odors from air that passes through the filter. For proper operation it is essential that the air to be filtered pass first through the charcoal filter paper 18, and then successively through the filter layers 17 and 16.

The filter element 12 and its frame 14 are manufactured separately, and then assembled. The layers 16 and 18 are secured to opposite sides of the fiber glass media 17, after which the assembly is corrugated and heat treated, so that the paper 16 sets and tends resiliently to hold the element 12 in its corrugated condition. The frame 14 can be made in conventional manner, as for example by welding channel-shaped aluminum frame members into rectangular configuration.

After the element 12 has been corrugated, an adhesive 22 is applied to opposite ends of its corrugations; and element 12 is then compressed and inserted into the empty frame 14 with the corrugations extending lengthwise of the frame. The compressed element is then rotated 90° to insert its upper and lower edges between the sidewalls 20 of the upper and lower sections of frame 14, and it is then released, so that it expands lengthwise of the frame 14 completely to fill the central opening thereof as shown. The adhesive 22 secures opposite ends of element 12 in frame 14, and also seals opposite ends of element 12, so that there is no chance of leakage, when the filter is in use.

Figure 3:
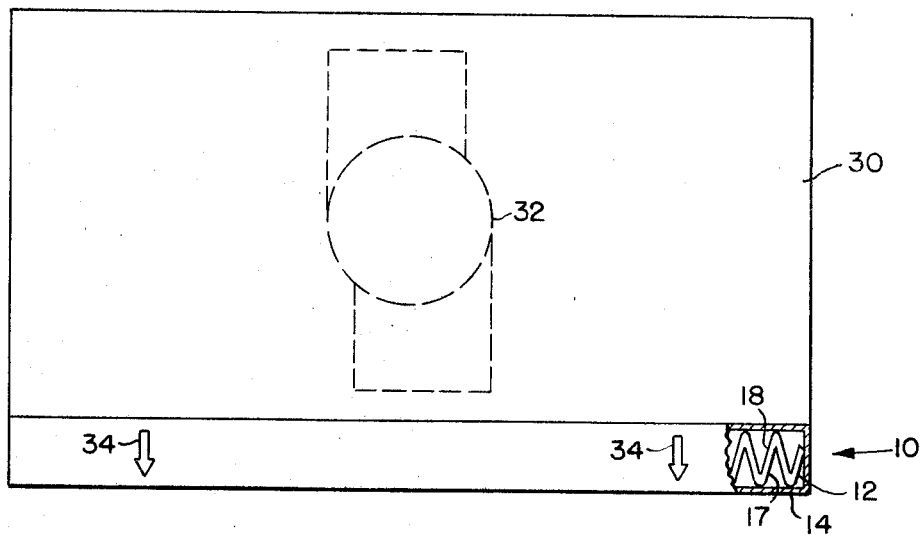
FIG. 3 is a plan view of an air filtering device of the type with which this novel filter is adapted to be employed.
Figure 2:
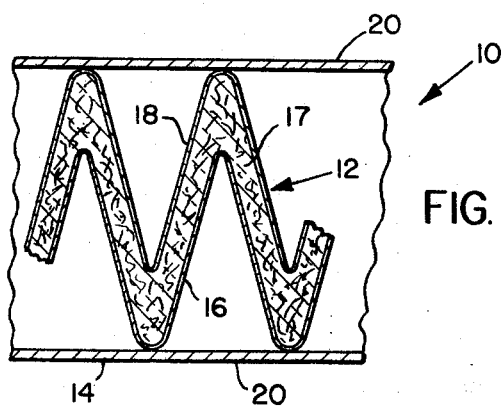
FIG. 2 is an enlarged, fragmentary sectional view of this filter taken along the line 2—2 in FIG. 1 looking in the direction of the arrows.

In use the filter 10 is designed to be secured across the front end of a hollow filter housing or plenum 30 (FIG. 3), which contains a conventional blower 32 for drawing air into the plenum through it back or sides, and exhausting the air through the filter 10 in the direction indicated by the arrows 34 (FIG. 3) inscribed on top of the frame 14. The charcoal filter paper 18 is positioned to face the exhaust of the blower 32 so that air from the blower will pass first through the layer 18, and then successively through layers 17 and 16 of element 12.

Although in the embodiment illustrated the element 12 is of the corrugated type, it will be apparent to one skilled in the art that element 12 could also be used in a laminar type filter in which the porous layers are disposed in plane, parallel layers, rather than in corrugated form.

From the foregoing it will be apparent that the instant invention provides a novel filter, which is extremely simple to manufacture, and substantially less expensive than filters of the electrostatic type. The ultimate cost of purifying air in homes, office buildings, and the like, therefore, can be reduced substantially.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

What I claim is:
1. An air filter, comprising
a housing having open ends,
a blower mounted in said housing and operable to draw air into one end of said housing and to exhaust it out the opposite end thereof, and
three layers of porous, corrugated material secured in registering relation with one another to form a multi-layered corrugated filter element which extends transversely of said housing and of the stream of air drawn through said housing by said blower,
   one of the two outer layers, the downstream layer, being treated with a relatively stiff, thermosetting material for resiliently holding the corrugations of said element in place,
   the central intervening layer comprising glass fibers, and
   the other outer layer, the upstream layer, being a sheet of charcoal paper impregnated with an activated carbon,
whereby air exhausted from said housing must pass first through said carbon impregnated layer, and then through the remainder of said layers.

2. An air filter comprising
a frame having side walls and an open front and an open rear,
a pleated filter element positioned across said frame with the ends of the filter element and the edges of the pleats attached to the side walls of the frame,
said filter element comprising
   a first sheet layer of filter paper treated with a thermosetting resin,
   a second sheet layer of filter paper impregnated with activated carbon, and
   a layer of fiber glass filter media positioned between and in contact with said first and second layers,
a hollow housing to the front end of which said frame is secured, and
a blower mounted in said housing and operable to draw air through the back of said housing and to exhaust the air through said filter element.

References Cited

UNITED STATES PATENTS

| | | | |
|---|---|---|---|
| 3,249,228 | 5/1966 | Arvanitakis | 55—500 |
| 3,402,531 | 9/1968 | Farr | 55—521 |
| 1,301,605 | 4/1919 | Ringel | 55—521 |
| 2,022,740 | 12/1935 | Rowell | 55—521 |
| 2,319,894 | 5/1943 | Vokes | 55—521 |
| 3,015,367 | 1/1962 | Smith et al. | 55—524 |
| 3,068,873 | 12/1962 | Allman et al. | 131—266 |
| 3,128,680 | 4/1964 | Schaaf | 131—265 |
| 3,176,448 | 4/1965 | Omohundro | 55—486 |
| 3,198,333 | 8/1965 | Brucken et al. | 210—505 |
| 3,217,470 | 11/1965 | Omohundro | 55—498 |
| 3,228,175 | 1/1966 | Zahn et al. | 55—486 |
| 3,260,370 | 7/1966 | Schwartzwalder | 210—503 |

FOREIGN PATENTS

| | | |
|---|---|---|
| 847,726 | 9/1960 | Great Britain. |
| 880,427 | 10/1961 | Great Britain. |
| 988,811 | 4/1965 | Great Britain. |
| 1,022,232 | 3/1966 | Great Britain. |

FRANK W. LUTTER, Primary Examiner

B. NOZICK, Assistant Examiner

U.S. Cl. X.R.

55—485, 487, 497, 511, 521, 524; 210—493